United States Patent [19]

Favre

[11] Patent Number: 4,734,322

[45] Date of Patent: Mar. 29, 1988

[54] PROCESS FOR THE PREPARATION OF A GLASS BASED CELLULAR MINERAL AND VARIOUS ARTICLES MADE THEREFROM

[75] Inventor: Claude Favre, Caluire & Cuire, France

[73] Assignee: Societe Nationale Elf Aquitaine, France

[21] Appl. No.: 825,579

[22] Filed: Feb. 4, 1986

[30] Foreign Application Priority Data

Feb. 4, 1985 [FR] France ................. 85 01507

[51] Int. Cl.[4] ................ B32B 3/26; C03B 19/08
[52] U.S. Cl. ..................... 428/312.6; 65/22; 156/78; 264/43; 501/39
[58] Field of Search ............ 428/312.6; 156/78; 65/22; 501/39; 264/43

[56] References Cited

U.S. PATENT DOCUMENTS

| | | | |
|---|---|---|---|
| 2,611,712 | 9/1952 | Ford | 501/39 |
| 3,272,646 | 9/1966 | Chopoorian et al. | 501/39 |
| 3,300,289 | 1/1967 | Long | 65/22 |
| 3,963,503 | 6/1976 | MacKenzie | 501/39 |
| 4,318,727 | 3/1982 | Pietsch | 65/22 |

FOREIGN PATENT DOCUMENTS

| | | | |
|---|---|---|---|
| 58-190828 | 11/1983 | Japan | 65/22 |
| 1412589 | 11/1975 | United Kingdom | 428/312.6 |

*Primary Examiner*—John J. Gallagher
*Attorney, Agent, or Firm*—Bacon & Thomas

[57] ABSTRACT

The invention concerns a process for the preparation of a glass based cellular mineral and also the manufacture of various articles from this material.

The process is characterized in that a mixture consisting of 100 parts by weight of ground glass and 0.2 to 2 parts by weight of calcium and magnesium carbonates in a ratio of $CaCO_3/MgCO_3$, is used, this mixture being placed into open refractory vessels, the rims of which have a minimum height of 15 cm and which are filled with said mixture to a minimum height of 6 to 12 cm and placed into a furnace with an appropriately regulated heating program.

Application in the manufacture of articles based on cellular glass, the structure of which makes possible attachment to or combination with a great variety of materials.

11 Claims, No Drawings

PROCESS FOR THE PREPARATION OF A GLASS BASED CELLULAR MINERAL AND VARIOUS ARTICLES MADE THEREFROM

The invention concerns a process for the preparation of a glass based cellular mineral and it further concerns various articles made therefrom.

It is known from numerous patents already published that it is possible to obtain an expanded glass by melting a mixture of glass powder, alkaline or alkaline earth silicates, sulfates, phosphates, and the like, in the presence of swelling agents, such as carbon, alkaline or alkaline earth carbonates, water, ebonite, carbon hydrates, glycerin, and the like materials.

Various programs or procedures have been applied to obtain the melting and the expansion of the glass in one or several stages, by using materials and furnaces making possible the production of cellular glass continuously or discontinuously. The means used provided good control of the "porometry", i.e. the distribution and the dimension of the pores that are mainly closed, together with the density of the final product, which under the industrial conditions applied heretofore could vary between 110 and 160 kg/m$^3$.

However, no need had been felt and no means found until now to obtain an expanded glass with a density range of 160 to 700 kg/m$^3$ exceeding a thickness of 10 to 12 cm, the proportion of open pores whereof could be controlled as desired, such a material has a very high potential of varied applications and uses.

It is therefore the object of the present invention to provide a process making it possible, in a simple and inexpensive manner, to obtain an expanded glass with a controlled distribution of pores, open in a proportion of 30 to 90%, i.e. the proportion of open pores is 30 to 90% by volume of 100% by volume of the pores, and with a density between 160 and 700 kg/m$^3$.

A further object of the invention is to create processes for the direct use of the expanded glass obtained by the process of the invention in the manufacture of a great variety of articles.

The invention concerns a process for the preparation of expanded glass from ground glass and a mixture of calcium and magnesium carbonates. The process is characterized in the use of a mixture containing 100 parts by weight of ground glass and 0.2 to 2 parts by weight of calcium and magnesium carbonate, and wherein the ratio of $CaCo_3/MgCo_3$ may vary between 20/80 to 80/20. The mixture is placed, for example, into open refractory vessels, the rims whereof have a minimum height of 15 cm and which are filled with the mixture to a minimum height of 6 to 12 cm, chosen as a function of the desired density. The vessels are then placed into a furnace, the heating program of which is regulated for a maximum rate of increase of 150° to 170° C. per hour after a temperature of 700° C. has been attained. Further heat is provided whereupon a temperature of approximately 800° C. is reached and then maintained for at least ½ hour, followed by cooling at a maximum rate of 80° C. per hour, while observing a maximum rate of 20° C. per hour in the zone from 600° to 500° C.

Under these conditions an expanded glass is obtained, the density, the ratio of the number of open pores to the number of closed pores and the respective dimensions of the pores whereof may be controlled as a function of the application intended.

Without being bound by a theory of operation, it is believed that by using a mixture of calcite and dolomite and applying the above described temperature program, porometry is controlled to the extent to which the dolomite, which decomposes at a lower temperature, generates around the calcite a $CO_2$ atmosphere which in turn delays the decomposition of the latter by displacing the equilibrium. The $CO_2$ originating in the calcite thus appears later in the course of the temperature program, (increase) at a moment when the viscosity due to the melting of the glass is more favorable for the trapping of the gas released and for obtaining the desired dimensions and the proportion of the open and closed pores. It should be noted that the "delay" of the release of $CO_2$ takes place in a "sensitive" zone in which the variation of the viscosity of the molten glass as a function of temperature is rather rapid. This makes it possible to vary to a large extent the various characteristics of the porometry of the final product and to subsequently allow the penetration to the depth desired of the other material that one intends to combine with the expanded glass.

According to a characteristic of the invention, initially, a premixture of glass powder/carbonates is prepared in a ratio of 200/10 to 200/15 and subsequently 4 to 30 parts by weight of this premixture is mixed with 96 to 70 parts by weight of ground glass having a fineness of 0 to 200 microns, with at least 70% passing through a mesh of 100 microns, the mixture obtained in this manner then being treated as defined hereinabove. The variation of the proportions of the premixture in the initial mixture makes it possible to obtain an expanded glass with a density varying from 160 to 700 kg/m$^3$.

The invention will become more apparent from the following description of embodiments of the invention.

A premixture is prepared from 200 kg of fine glass powder, 9 kg calcite and 3 kg dolomite in powder form and the mixture is placed in a mixer or a concrete mixer to obtain a homogenous and easily flowing powder. From flat glass or bottle glass scrap, a glass powder with particle dimensions between 0 and 200 microns is then prepared. At least 80% of these particles must pass through a 100 micron mesh.

In a first experiment, 15 kg of the above premixture and 85 kg of the glass powder are mixed together and this mixture is charged with good distribution and without settling, to a height of approximately 66 mm into refractory ceramic vessels, 600 mm long and wide and 250 mm high, the bottom of which is lined with kraft paper intended to be carbonized during the firing or is sprinkled with a slip or another stripping agent. As a well distributed charge without settling, the mold thus contains a charge of approximately 75 kg/m$^2$. It is then placed into a furnace the temperature of which is raised in 1 hour to 700° C. and during the following 3/2 hours the temperature is progressively raised to 800°, which is maintained for 1 hour, whereupon heating is discontinued or lowered. In a well insulated furnace the drop in temperature does not exceed 50° C. per hour. In actual practice, after 24 hours a homogeneously expanded product with a thickness of more than approximately 27 cm and with a density of approximately 250 kg/m$^3$ is taken from the furnace.

In a second experiment, 5 kg of the premixture are mixed with 108 kg of glass powder and the same molds are filled to a height of approximately 95 mm. The application of a similar heating cycle yields an expanded glass with a height of 19 cm and a density of approximately 600 kg/cm$^3$.

The substantial thickness obtained by the process according to the invention is clearly different from that of the prior art.

Depending on production requirements, it is possible to operate continuously, for example, by moving a succession of molds, which may be larger than those described above, in one layer or several superposed layers, in a tunnel furnace, the programming whereof produces the same heating and cooling conditions as in the furnace indicated above. To save energy, the furnace may comprise two floors, the upper floor being reserved for motion in one direction and the lower floor for motion in the other direction. An air circulation system operating at an appropriate velocity then makes it possible to recover the heat of the products below during their cooling to heat the material starting above.

Instead of placing the products into molds circulating on rollers, it is thus possible, following the interposition of an antiadhesion sealing system as described above, to place the powder on an endless refractory conveyor equipped with borders, also of a refractory material, to limit the lateral expansion of the glass.

In any case, preheating of the powder is recommended. Care must be taken, however, not to exceed the temperature of the onset of the decomposition of the dolomite by too much so as not to lose the benefit of the delayed release of the $CO_2$.

The density of conventional glass is approximately 2,500 kg/m$^3$. An expanded glass with a density of 250 kg/m$^3$ therefore has a total porosity of 90%. The proportion of open pores is determined preferably by the absorption of gas rather than of a liquid, in order to avoid incomplete filling due to the surface tension of the liquid. Measurements carried out on the glass described above yielded a filling coefficient in air of 77%. The glass is thus considered as having an open porosity of 77% and a closed porosity of 13%.

According to one characteristic of the invention, the expanded glass obtained continuously (conveyor or molds) or discontinuously (in molds) is discharged in parallelpipeds used in various applications, such as stationary or circulating receptacles of liquid or gaseous fluids to make for example space humidifers, liquid retention masses for flower pots, heat exchanger elements, filter elements, supports for culture of plants, mushrooms or microorganisms, and the like. Such applications are facilitated by the large proportion of open pores provided by the process according to the invention and are made feasible in many cases by the resistance of glass to chemical agents and elevated temperatures which even the strongest polymers cannot withstand.

Another application consists of using blocks of the expanded glass according to the invention, suitably shaped and assembled if necessary, in the preparation of composite pieces, such as the cores of panels with large surfaces or as elements of multilayer assemblies. The high rigidity of glass make it possible to use it to make partitions, internal floors and relatively light vertical or horizontal external structural elements, while providing good thermal and acoustical insulation.

It is also possible to shape blocks to provide them with highly varied configurations and to use them as the cores of composite pieces. These cores may be permanent and may remain in the composite pieces, or they may be temporary and in which case they are removed by mechanical destruction and the clearing out the glass debris generated in this manner.

According to a further characteristic of the invention, the material obtained, optionally milled, shaped and/or assembled, is adhesively bonded and combined with other elements of a finishing material, such as plaster, wood, natural or artificial stone, ceramic, metal, solid, expanded and/or laminated polymers, composite materials, complex structures integrating various grids, such as tubes or electric resistors or supports of telescope or solar concentrators, and the like. Depending on the materials combined with the expanded glass it is thus possible to obtain a great variety of articles, distinguished by their lightness and rigidity. If necessary, certain uncoated surfaces may be provided with a finish coat.

As examples, the following may be cited: insulating and supporting walls, ceilings, partitions, and the like.

A light "natural" stone may be obtained for example as follows:

From the raw expanded glass, blocks are cut by sawing, coated with an adhesive which penetrates the pores to a certain depth and combined with a thin stone plate. After the drying or hardening of the adhesive, the composite has sufficient mechanical strength to support the usual handling and to receive the finishing operations (polishing, sealing of the other surfaces, etc. ) that may be necessary in view of the applications intended. The end product is a finished element, the visible surface of which is natural stone and the average density of which amounts to 35 to 60% of the density of the initial stone. This reduction in weight is particularly important in the case of stone plates to be applied to facades, as there is an appreciable reduction in the forces acting on the adhesives and it may be possible to eliminate installation fasteners.

The expanded glass may also be supplied in plate form, patterned to relief, combined with different materials and subsequently given a finishing treatment. It is thus possible to cover it with a mineral enamel, applied in the conventional manner and fire it in a furnace without altering the structure of the expanded glass. It is also possible to cover it with a polymerizable organic product, the state of polymerization by methods known in themselves. These polymers may be thermoplastic or thermosetting depending on the intended application of the finished articles.

A light "artificial" stone may be obtained in the following approximate manner:

blocks of expanded glass are coated on one face with a layer of a mortar consisting of at least 30% of a polyester resin and a maximum of 70% of hard fillers less than 200 microns in size, and on the other face with another layer of a mortar consisting of the same polyester resin and various hard fillers, the particles of which have larger dimensions. The choice of the nature, the quantity and the dimensions of the particles included in the first layer of mortar and the conditions of their application makes it possible to give the corresponding face different appearance, for example of natural rocks, marble, porphyry, etc. By virtue of the good penetration of the mortar into the expanded glass, here again a product with excellent mechanical strength is obtained and depending on the relative thickness of the expanded glass and the two mortar layers, the weight of the final product is reduced, offering the same advantage as in the previous case.

As examples, the following enamelled squares may be described: of an expanded glass with a density of 250 kg/m$^3$, blocks are cut by sawing, with essentially the length and width of the square to be produced, and with a thickness of approximately 25 mm. Following an optional surface treatment, such as sand blasting, die stamping, grinding, to produce the relief pattern desired, a light enamel coating (0.5 kg/m$^2$) is applied and fired in a furnace in the conventional manner. Squares or plates are obtained, which when large (600×600 mm) may again be used as ceiling elements distinguished by their decorative effects and/or their acoustic insulating properties. A somewhat heavier enamel coating (approximately 1.8 kg/m$^2$) yields an extensive range of tiles for walls or other uses.

An important application consists of combining expanded glass, on the surface or in depth, with active substances, such as conductive polymers or solid electrolytes to form batteries and accumulators, with catalytic materials usable in chemical reactors, antipollution mufflers, and the like.

The expanded glass comprising open pores according to the invention may be modified in its internal structure by chemical or physical processes and it may further be filled after its manufacture with different organic or mineral products, such as expandable or nonexpandable polymers, resin mortars, bitumen, adhesives, cements, etc. The filling may involve all or part of the thickness of the blocks to expanded glass being treated. Filling may also be total or partial with respect to each pore. Obviously, the thickness to which a block is filled and the filling coefficient of each pore may vary as a function of operating modes, pressure, temperature, duration of treatment, etc. and the characteristics of the filler agents. In this manner, by a primary conversion of the characteristics of the expanded glass new ranges of materials are created, which may be used directly or in all or part of the aforedescribed combinations. As a nonlimiting example, the expanded glass of the invention is used in the construction of floats usuable at great depths or on the surface and wherein blocks of expanded glass are soaked in bitumen, polymer bitumen and/or appropriate polymers. The fact that the closed pores are not filled makes it possible to obtain floating materials.

It should be understood that the present invention is not limited to the above described examples, but that it includes all of the variants apparent to those skilled in the art.

I claim:

1. A process for the preparation of a porous expanded glass which comprises the steps of:
   (a) providing a mixture comprising of 100 parts by weight of ground glass and 0.2 to 2 parts by weight of calcium carbonate and magnesium carbonate in a CaCO$_3$ to MgCO$_3$ weight ratio ranging from 20:80 to 80:20;
   (b) placing said mixture in open refractory vessels, the rims whereof have a minimum height of 15 cm, in such a way that said vessels are filled to a minimum height of 6 to 12 cm;
   (c) heating said filled vessels in a furnace until a temperature of approximately 800° C. is reached, said heating being carried out so that after a temperature of 700° C. is attained a maximum heating rate of 150° C. to 170° C. per hour is observed;
   (d) maintaining said temperature of approximately 800° C. for at least half an hour; and then
   (e) cooling the heated vessels at a maximum rate of 80° C. per hour with the proviso that a maximum cooling rate of 20° C. per hour is observed in the temperature range of from 600° C. to 500° C., to obtain an expanded glass having a thickness exceeding 10 cm and having a density range of from 160 to 700 kg/m$^3$ and a proportion of open pores of 30 to 90% by volume based on the total volume of pores.

2. A process according to claim 1, wherein the mixture of ground glass and carbonates of step (a) is obtained by initially preparing a premixture of glass powder and carbonates in a glass powder to carbonates weight ratio of 200:10 to 200:15 and then mixing 4 to 30 parts by weight of said premixture with 96 to 70 parts by weight of ground glass having particle dimensions up to 200 microns with at least 70% of the glass particles passing through a mesh of 100 microns.

3. The expanded glass obtained by the process of claim 1.

4. The expanded glass of claim 3 in the form of parallelepipeds containing a stationary or circulating liquid or gaseous fluid.

5. The expanded glass of claim 3 in the form of shaped elements forming parts of composite pieces.

6. The expanded glass of claim 3 in the form of shaped elements bonded to elements of a material selected from the group consisting of plaster, wood, natural or artificial stone, ceramic, solid glass, metal, solid polymers, expanded polymers and/or laminated polymers and composite materials.

7. The expanded glass of claim 3 combined with a curable or polymerizable material.

8. The expanded glass of claim 3 supporting an active organic or mineral substance.

9. The expanded glass of claim 3 filled to a slight depth or to the core by a mineral or organic product.

10. The expanded glass obtained by the process of claim 1 in the form of blocks having a thickness exceeding about 10 cm and further having a specific gravity between 160 kg/m$^3$ and 700 kg/m$^3$ and a volume of open pores ranging from 30 to 90% of the total volume of the pores.

11. The expanded glass obtained by the process of claim 2 in the form of blocks having a thickness exceeding about 10 cm and further having a specific gravity between 160 kg/m$^3$ and 700 kg/m$^3$ and a volume of open pores ranging from 30 to 90% of the total volume of the pores.

* * * * *